(No Model.)

P. RICHARDSON.
VEHICLE WHEEL.

No. 573,238. Patented Dec. 15, 1896.

WITNESSES:
L. N. Legendre
Wm. P. Patton

INVENTOR
P. Richardson
BY
ATTORNEYS.

UNITED STATES PATENT OFFICE.

PARIS RICHARDSON, OF DESHLER, NEBRASKA.

VEHICLE-WHEEL.

SPECIFICATION forming part of Letters Patent No. 573,238, dated December 15, 1896.

Application filed April 15, 1896. Serial No. 587,636. (No model.)

*To all whom it may concern:*

Be it known that I, PARIS RICHARDSON, of Deshler, in the county of Thayer and State of Nebraska, have invented new and useful Improvements in Vehicle-Wheels, of which the following is a full, clear, and exact description.

This invention relates to a class of vehicle-wheels wherein a divisible hub is employed as a portion of the wheel.

The object of the invention is to provide a vehicle-wheel of the indicated type that possesses novel features of construction which adapts the spokes and sectional fellies thereon to press outwardly on an endless tire and hold the latter tightly bound on the felly-sections concentric with the bore of the hub.

The invention consists in the novel construction and combination of parts, as is hereinafter described, and pointed out in the claims.

Reference is to be had to the accompanying drawings, forming a part of this specification, in which similar characters of reference indicate corresponding parts in all the figures.

Figure 1:
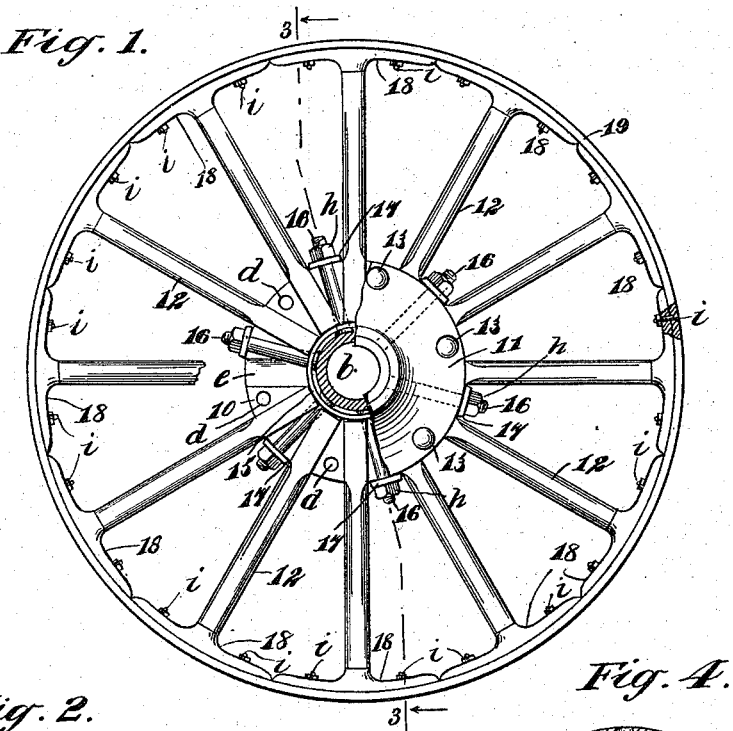
Figure 2:
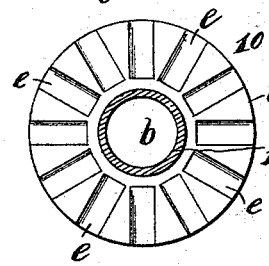
Figure 4:
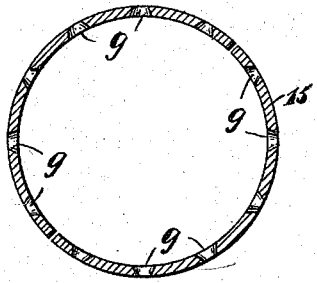
Figure 3:
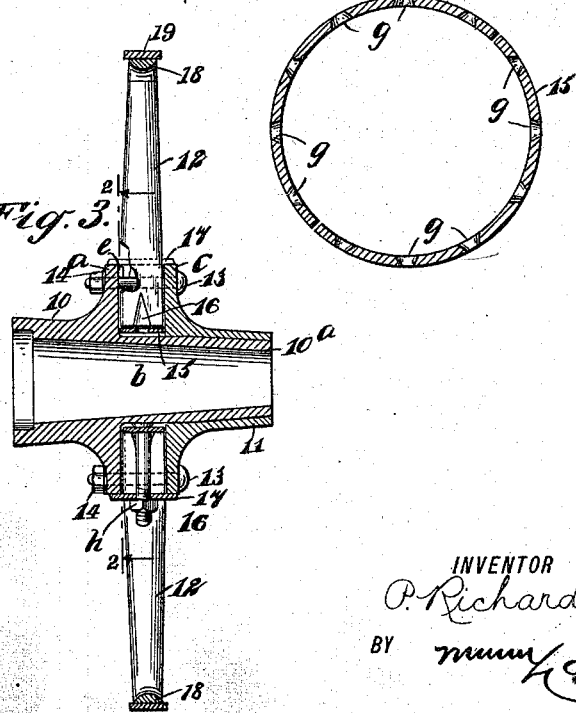

Figure 1 is a partly sectional front view of the improved vehicle-wheel. Fig. 2 is a transverse sectional view of the wheel-hub substantially on the line 2 2 in Fig. 3. Fig. 3 is a longitudinal sectional view of the wheel-hub and transverse section of the rim and tire of the wheel substantially on the line 3 3 in Fig. 1, and Fig. 4 is an enlarged sectional side view of a divided ring that is an essential feature of the invention.

The improvements are applicable to wheels for vehicles of any style, light or heavy, it being understood that the parts are to be proportioned to correspond with the dimensions of such wheels.

In the embodiment of the invention as represented in the drawings, 10 represents the main section of a two-part separable hub, and 11 the complementary section of the hub. The hub-section 10 is formed with a circumferential flange $a$ at a suitable distance from its ends, and this section is centrally and longitudinally bored, as shown at $b$, to receive an axle-spindle.

One face of the flange $a$ is rendered true, and said flange on the face mentioned is preferably formed at right angles with the axis of the bore $b$. From the flange $a$ toward what may be considered the outer end of the hub-section 10 the latter is diametrically reduced, as shown at $10^a$, which adapts this part to slidably engage with the cylindrically-bored hub-section 11, as best shown in Fig. 3. There is a circumferential flange $c$ formed on the hub-section 11 at a correct distance from its ends, and said flange is rendered true on its face that is opposite the front face of the flange $a$ and is parallel therewith. A sufficient space intervenes the opposite faces of the flanges $a$ and $c$ to permit the free introduction of the series of spokes 12 between said flanges, the ends of the spokes so inserted being parallel on the faces that are nearest the flanges between which they pass.

The hub-sections 10 and 11 are similarly perforated in their flanges $a$ and $c$, said holes $d$ being so spaced apart as to locate one perforation between each pair of spokes 12 for reception of the clamping-bolts 13, whereon are the nuts 14. The front face of the flange $a$ is preferably furnished with a number of shallow recesses $e$, that are radial to the center of the bore $b$, and these recesses are evenly spaced apart for reception of the spoke ends which are located in the hub.

There is a divided ring 15 placed around the reduced body $10^a$ of the hub-section 10 between the flanges $a$ and $c$ when parts of the hub are assembled for service, and it will be seen that the inner ends of the spokes 12 are seated on the peripheral surface of the divided ring. The ring 15 may be severed in one place or be divided into two or more parts, wherein spaced perforations are formed for the introduction of the radial bolts 16, that are arranged to project outwardly between pairs of spokes 12, as best shown in Fig. 4.

The perforations $g$ formed in the ring 15 are countersunk on the inner side of the latter to receive coniform heads on the bolts 16, and the cylindrical bodies of said bolts pass between the spokes 12 through mating grooves produced in the inner ends of the spokes, as indicated in Figs. 1 and 3. A sufficient length is afforded the bolts 16 to permit their threaded end portions to project far enough beyond the edges of the flanges $a$ and $c$ to receive the perforated clamping-plates 17 and nuts $h$.

The clamping-plates 17 are of a size that will allow their ends to lie on the peripheral edges of the flanges $a$ $c$ and not project laterally therefrom, as shown in Fig. 3. The outer ends of the spokes 12 are furnished with short fellies 18, that are secured on the spokes and have their curved outer faces adapted to fit closely against the inner surface of the endless ring of metal that forms the tire 19 of the wheel.

It is essential that the length of the spokes 12 and thickness of the fellies 18 be so proportioned to the distance between the outer surface of the ring 15 and inner surface of the tire 19 that the spokes and fellies will fit closely in the space mentioned when the divided ring 15 is in contact with the hub-section 10, or, rather, with the reduced cylindrical portion $10^a$ of said hub-section.

When the parts of the wheel-hub are assembled, the laterally-disposed bolts 13 have their nuts 14 drawn tightly, thus binding the two sections of the hub together and clamping the edges of the spokes 12 between the flanges $a$ and $c$ of said hub. The tire 19 being in place on the fellies 18, it will be evident that if the nuts $h$ on the radial bolts 16 are adjusted to draw the bolts outwardly the ring 15 will be slightly spread in its sections, so as to increase its diameter, and this will press the spokes 12 toward the tire, thereby forcibly pressing the fellies 18 against the tire, which will render the wheel firmly joined in all its parts. The fellies 18 are preferably fastened to the tire 19 by bolts $i$, that have their heads countersunk in the tire, as usual, the nuts of the bolts engaging the fellies, as indicated in Fig. 1.

Having thus described my invention, I claim as new and desire to secure by Letters Patent—

1. The combination with a tire, spokes, and fellies on the spokes and independent of each other, of a wheel-hub composed of two sections, one slidable on the other, said sections having parallel flanges receiving the inner ends of the spokes between them, bolts and nuts to bind the hub-sections together, a divided ring in the hub, whereon the inner ends of the spokes are seated, radial bolts having engagement with the divided ring and projecting between the spokes, clamping-plates on the outer ends of the radial bolts and resting on the hub-flanges, and nuts for the outer ends of said bolts, substantially as described.

2. In a vehicle-wheel of the described construction, the wheel-hub comprising the two circumferentially-flanged hub-sections, one section slidable on the other section, radial spaced recesses in the face of one circumferential flange, spaced bolts engaging perforations in the flanges and having nuts adapted to draw the hub-sections together, a divided ring in the hub between its flanges, radial bolts having their heads engaged with the inner side of the ring and their bodies projecting through the perforations thereof, clamping-plates on the outer ends of the radial bolts, and nuts on said bolt ends pressing said plates on the flanges of the hub, substantially as described.

3. A wheel having a hub provided with two annular flanges, an expansive ring located between the flanges, a series of spokes having their inner portions located between the flanges and bearing on the ring, a tire engaging the outer ends of the spokes, clamping-plates bearing on the outer edges of the flanges, and bolts connected to the clamping-plates and to the ring, substantially as described.

PARIS RICHARDSON.

Witnesses:
J. H. AUFDERHEIDE,
WM. STRUDE.